Patented Nov. 8, 1949

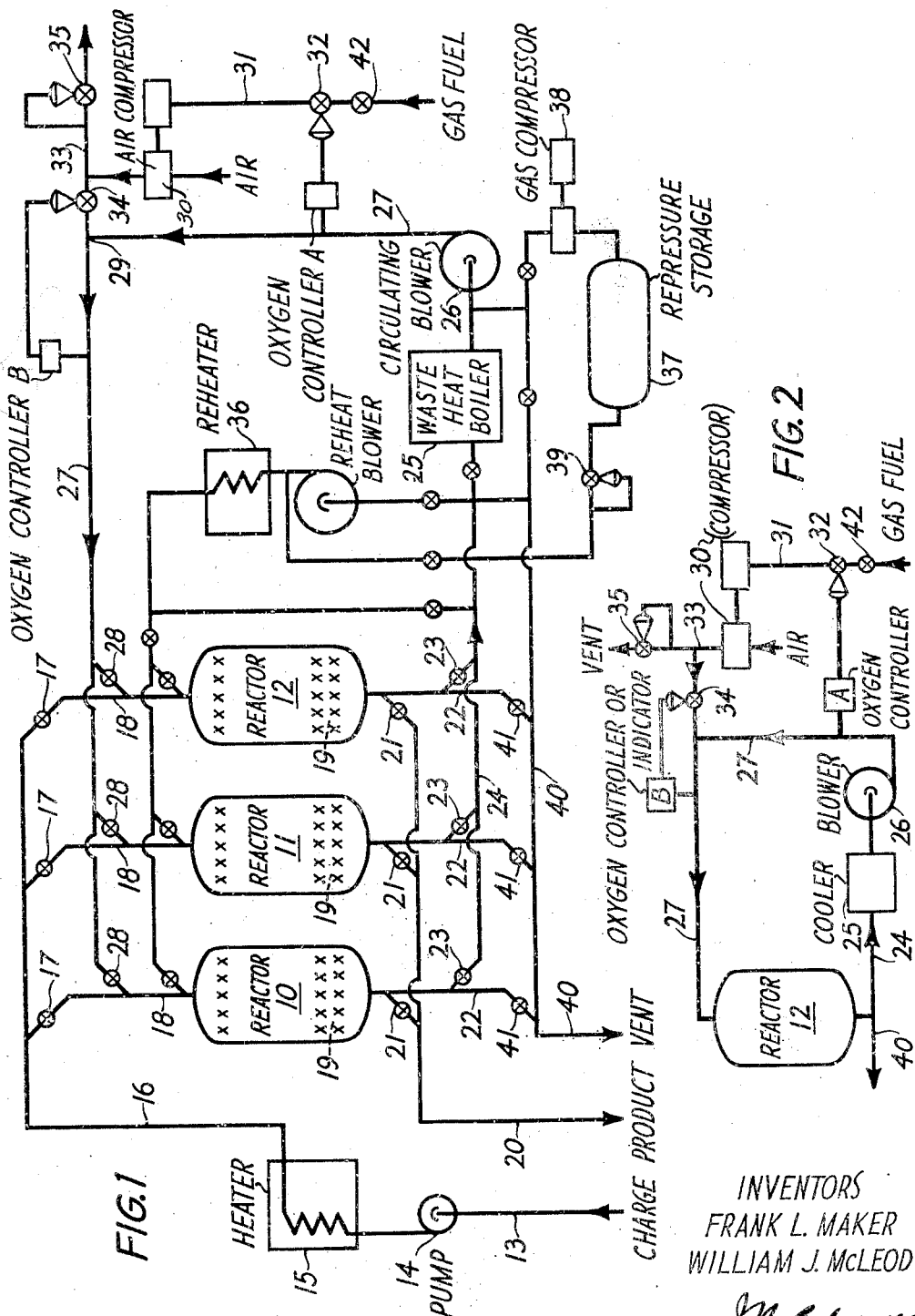

2,487,717

UNITED STATES PATENT OFFICE 2,487,717

APPARATUS FOR CONTROLLING CATALYST REGENERATION

Frank L. Maker, Berkeley, and William J. McLeod, Richmond, Calif., assignors, by mesne assignments, to California Research Corporation, San Francisco, Calif., a corporation of Delaware Application May 22, 1944, Serial No. 536,778

2 Claims. (Cl. 23—288)

This invention relates to apparatus for regenerating catalysts and particularly refers to such apparatus as may be applicable to the regeneration of a fixed-bed, solid-pellet type catalyst used for hydrocarbon conversion during which conversion the catalyst mass has become carbonized or otherwise contaminated with reaction products that decrease the effectiveness of the catalyst for its intended purpose and require periodic removal, usually by controlled oxidation of the carbon or other contaminant at a temperature below that at which the catalyst mass will be adversely affected.

Heretofore, attempts have been made to control the temperature of these reactions by varying the rate of circulation of the inert gases and oxygen or other reagent used, or by intermittently varying the concentration of reagent therein, or by imposing high pressure on the system, according to the temperature of the catalyst mass. Because of the large catalyst masses which are often involved with consequent lack of uniformity of regeneration as well as temperatures attained, and the lack of accessibility of all parts of the catalyst, these have not been entirely successful, in spite of the elaborate systems that have been devised and constructed.

This invention broadly comprehends the steps of maintaining the concentration of reagent in the circulating fluid stream, such as a mixture of oxygen and the gas or other combustion products, at a constant low value, for example less than about one per cent, at the beginning of the regeneration operation, so that the heat capacity of the catalyst mass is adequate to limit the temperature attained by the controlled combustion or other reaction, and then analyzing the oxygen or reagent content of the circulating effluent stream of fluid leaving the catalyst mass, and, when the regenerating reaction has proceeded to a point where the reagent appears in the effluent gas, controlling the rate of oxygen or reagent addition to the circulating fluid stream according to its concentration in said effluent fluid stream.

It is an object of this invention to provide apparatus for controlling the regeneration of catalysts that are susceptible to damage by uncontrolled reactions, such as excessive heating due to combustion of contaminants, which may permanently reduce the effectiveness of said catalyst.

Another object is to provide apparatus for controlling the temperature attained by a catalyst during regeneration that does not require temperature measurements in the body of said catalyst. By the time such temperatures reach dangerously high values, it is too late to control them by modifying the oxygen content of the recirculating gas stream, as has heretofore been the practice.

Another object is to provide apparatus for controlling the temperature attained by a catalyst during regeneration that is easily adaptable to present equipment, with a minimum of alterations thereto.

These and other objects and advantages will be further apparent from the following description and the accompanying drawing, which illustrates a preferred embodiment of the invention as applied to a hydrocarbon catalytic reaction process with means for periodically regenerating the catalyst to restore its original activity.

In the drawing, Figure 1 is a diagrammatic flow chart of a practical arrangement of catalyst chambers and means for regenerating the catalyst masses therein.

Figure 2 is a diagrammatic and simplified flow chart of a single reactor with one example of associated equipment suitable for carrying out this invention.

Referring to Figure 1, reference numerals 10, 11, 12 designate catalyst chambers or converters which are supplied with fluid hydrocarbons entering the system through line 13, pump 14, heater 15 and line 16, the latter being manifolded by valves 17 and inlet branches 18 so that any one or more of the chambers may be supplied with said hydrocarbons. Each chamber 10, 11, 12 is filled with a suitable catalyst material 19, the internal arrangement being immaterial to this invention. A reaction product line 20 is manifolded by valves 21 to the outlet branches 22 of chambers 10, 11, 12, and leads to storage or any further treatment that may be desired or required for those products.

After a period of hydrocarbon conversion, catalyst 19 generally becomes coated or even filled with carbonaceous materials that reduce the effectiveness of the catalyst mass, as is well known in this art. The catalyst being at a high temperature, usually in the neighborhood of 1000° F., it is common practice to burn off the carbonaceous material and thus regenerate the catalyst by flowing through it at controlled rates a fluid stream of inert gases such as the flue gas or nitrogen and carbon dioxide or even some uncombined materials such as carbon monoxide from a previous regeneration operation, with the addition of controlled proportions of a reagent such as oxygen, to react with and remove the catalyst contaminant, in this case carbon or coke, As stated above, various procedures have been employed for limiting the temperature of the resulting reaction, to prevent sintering or other types of damage to the catalyst mass 19, most of these procedures being controlled by thermocouples or similar temperature responsive means in the catalyst mass.

In this example, the regeneration may be carried out by inert or other gas from any suitable source, such as another reactor of the group which has substantially completed its regeneration operation, the flue gas being discharged from the proper outlet branch 22 through its manifold valve 23 into line 24 from which it may pass through a cooler such as waste heat boiler 25 to blower 26, thence into line 27 and back through one of manifold valves 28 into that branch 18 leading to the reactor to be regenerated. Circulation of the gas having been established through the chamber desired, regeneration of the contaminated catalyst is instituted by controllably admitting a source of oxygen such as compressed air into line 27 at point 29. In this example air compressor 30, which may be gas engine driven, receives its fuel through line 31 and regulator valve 32, and discharges compressed air into outlet line 33 and through regulator valve 34 to line 27 at point 29. A pressure-limiting means such as valve 35 is provided for line 33 to vent any excess air to the atmosphere or other lower pressure space, or a valve lifting pressure controller may be permanently attached to compressor 30.

In addition to means, such as a cooler or waste heat boiler 25, for abstracting heat from the fluid stream of inert gas leaving the reactor being regenerated, other means such as a reheater 36 may be provided for adding heat to all or a part of the gas in case the temperature of the catalyst is to be raised, for example, preparatory to a new operation. A gas storage tank 37 with a compressor 38 and regulator valve 39, together with suitable valved piping connections to line 24 and a vent line 40, manifolded to outlets 22 by valves 41, may be included to provide a source of high pressure gas for repressuring a catalyst chamber after evacuation of reaction products, and to release from the system unwanted products of combustion, respectively. A manually controlled valve 42 is provided in the fuel gas line 31 to air compressor 30 to provide sufficient fuel to keep it operating at a desired constant rate, when the control means for regulator valve 32 are not functioning, as will be described in more detail below.

To control the oxygen content of the circulating gas stream in line 27 to catalyst chambers 10, 11, 12 of this example, two controllers or regulators of any well known type may be utilized. Controllers A and B are adapted either continuously or at frequent intervals to analyze for oxygen content the gases passing through line 27, unit A at a point ahead of the oxygen or air inlet 29, and unit B at a point between air inlet 29 and the inlets to catalyst chambers 10, 11, 12. Under certain circumstances controller B may be a simple indicator, rather than a device exercising a regulating or supervising function, as will be described below. In the arrangement of this example, however, oxygen controller A is adjusted to be inoperative to actuate regulator 32 until the oxygen content of the gas passing the blower 26 reaches about 0.5%. Similarly, controller B is adjusted to be inoperative to actuate regulator 34 until the oxygen content of the gas and air mixture leaving point 29 in line 27 reaches about 0.8%. Meanwhile, manual valve 42 or its equivalent is adjusted according to the indication of oxygen controller B so that compressor 30 will admit enough air to the mixture of inert gases and air leaving point 29 and flowing toward the catalyst chambers 10, 11, 12, to raise the oxygen content to about 0.8%.

Thus, for the initial period of the regeneration operation manually adjusted valve 42 permits compressor 30 to run at a constant speed, so that a substantially constant arbitrarily selected oxygen content is maintained in the circulating gases entering the desired catalyst chamber to initiate the removal of contaminants, such as coke or carbon, therefrom. After this has proceeded for some time, dependent upon the size of the chamber, the volume of catalyst, the rate of operation of blower 26, etc., all of the oxygen supplied to the chamber will not be consumed and it will "break through" the catalyst even though the latter is incompletely regenerated. If this oxygen were permitted to be added to the substantially constant amount supplied by compressor 30, as just described, the aggregate or total oxygen concentration in the gases leaving point 29 through line 27 would become great enough to produce undesirably intense local reactions in the catalyst regeneration and would possibly damage the catalyst. Consequently, when the oxygen content of the gas in line 27 passing controller A becomes over about 0.5%, that controller will actuate regulator valve 32 to reduce the fuel gas to compressor 30 and correspondingly reduce the air entering the circulating gas stream at point 29.

In this example, where a gas engine driven compressor is illustrated, the regulator valve 32 will normally only be able to reduce the speed and output of compressor 30 to a minimum dependent upon the size, type and characteristics of the compressor. Thereafter, as more oxygen breaks through the catalyst being regenerated, it is usually necessary to provide additional control means therefor, in the shape of oxygen controller B, which, when the total concentration of oxygen in the gas stream leaving point 29 reaches about 0.8%, will actuate regulator valve 34, in the air line 33 between compressor 30 and point 29 in line 27 to reduce the air flow therethrough. Thus both oxygen controllers would be in operation during the latter or final stages of the regeneration operation, controller A reducing the speed of compressor 30 to its minimum practical value and controller B throttling the air output to the gas stream to keep the oxygen content below the desired maximum. Unless compressor 30 is fitted with pressure-controlled valves, some types of pressure release, such as regulator valve 35, will usually be necessary to vent the excess air output to the atmosphere or other lower pressure space.

Thus it will be appreciated that a novel apparatus for controlling the rate of regeneration of a catalyst in a system of this kind has been described and illustrated, wherein the primary control of the oxygen supplied to the catalyst, after an initial period of substantially constant oxygen content in the regenerating gases, is determined by the oxygen content of the gases leaving the catalyst bed after "break through" has occurred. This enables the practical utilization of that procedure of maximum temperature control within the catalyst that depends on oxygen concentration, for a concentration of less than about 1% in the circulating gas stream to and through the reactor will ordinarily not produce even local overheating of the catalyst, no matter what is the rate of total gas circulation.

Although only one specific example of this invention and its mode of application to a given set of conditions have been described and illustrated, it is obvious that numerous changes could be made in the procedures outlined, and all those modifications that come within the scope of the appended claims are embraced thereby.

We claim:

1. In apparatus for effecting changes in organic fluids, comprising, in combination a converter providing a reaction chamber adapted to contain a contact mass, valved inlet and outlet conduits connected to the converter for admission and withdrawal of regenerating medium, a circulation conduit connecting said outlet and inlet conduits, an air compressor having its outlet connected to said circulation conduit, a control device associated with said air compressor and arranged to control the speed thereof, a device for analyzing the circulating gas stream for oxygen concentration associated with said circulation conduit at a point upstream of where the air compressor connects therewith, said device being constructed and arranged to actuate said control device when it measures an oxygen concentration of predetermined value, a valve in the outlet of the air compressor, and a second device for analyzing the circulating gas stream for oxygen concentration associated with the circulation conduit at a point downstream of where the air compressor connects therewith, said second device being constructed and arranged to actuate said valve when it measures an oxygen content of predetermined value.

2. In apparatus for effecting changes in organic fluids, comprising, in combination, a converter providing a reaction chamber adapted to contain a contact mass, valved inlet and outlet conduits connected to the converter for admission and withdrawal of regenerating medium, a circulation conduit connecting said outlet and inlet conduits, an air compressor having its outlet connected to said circulation conduit, an automatically operated valve in said outlet, a control device associated with said air compressor and arranged to control the speed thereof, and a pair of automatic analytical devices for analyzing the circulating gas stream for oxygen concentration connected in said circulation conduit upstream and downstream from said air compressor outlet, one of said analyzing devices being connected to said control device to actuate the same when said analyzing device measures an oxygen concentration of a predetermined value, the other of said analyzing devices being connected to said valve to actuate the same when said other analyzing device measures an oxygen concentration of predetermined value.

FRANK L. MAKER.
WILLIAM J. McLEOD.

REFERENCES CITED

The following references are of record in the file of this patent:

UNITED STATES PATENTS

| Number | Name | Date |
|---|---|---|
| 823,845 | Conrader | June 19, 1906 |
| 2,344,770 | Gunness | Mar. 21, 1944 |
| 2,393,839 | Thomas et al. | Jan. 29, 1946 |